United States Patent
Plevacova et al.

(10) Patent No.: US 9,377,204 B2
(45) Date of Patent: Jun. 28, 2016

(54) OVEN DOOR

(71) Applicant: EUROKERA S.N.C., Chateau Thierry (FR)

(72) Inventors: Kamila Plevacova, Courbevoie (FR); Edouard Brunet, Paris (FR); Olivier Dargaud, Meudon (FR)

(73) Assignee: EUROKERA S.N.C., Chateau Thierry (FR)

( * ) Notice: Subject to any disclaimer, the term of this patent is extended or adjusted under 35 U.S.C. 154(b) by 0 days.

(21) Appl. No.: 14/386,443

(22) PCT Filed: Mar. 19, 2013

(86) PCT No.: PCT/FR2013/050577
§ 371 (c)(1),
(2) Date: Sep. 19, 2014

(87) PCT Pub. No.: WO2013/140081
PCT Pub. Date: Sep. 26, 2013

(65) Prior Publication Data
US 2015/0107575 A1 Apr. 23, 2015

(30) Foreign Application Priority Data
Mar. 20, 2012 (FR) ..................... 12 52479

(51) Int. Cl.
*F23M 7/00* (2006.01)
*F24C 15/04* (2006.01)
(Continued)

(52) U.S. Cl.
CPC .............. *F24C 15/04* (2013.01); *C03C 3/085* (2013.01); *C03C 3/087* (2013.01); *F24C 15/006* (2013.01)

(58) Field of Classification Search
CPC ......... F24C 15/04; F24C 15/006; C03C 8/08; C03C 8/22
USPC ............... 126/198, 200; 501/5, 24, 2, 70, 16; 428/410; 219/391
See application file for complete search history.

(56) References Cited

U.S. PATENT DOCUMENTS 4,438,210 A 3/1984 Rittler
7,005,396 B2 * 2/2006 Espargilliere et al. .......... 501/24
(Continued)

FOREIGN PATENT DOCUMENTS

DE 102004011009 A1 * 9/2005 ............. C03C 21/00
(Continued)

OTHER PUBLICATIONS

DE 102004011009A1, Beier et al, Surface modified, Multi-component Glass articales, Sep. 2005, M/c translation.*
(Continued)

*Primary Examiner* — Gregory Huson
*Assistant Examiner* — Nikhil Mashruwala
(74) *Attorney, Agent, or Firm* — Pillsbury Winthrop Shaw Pittman LLP

(57) ABSTRACT

A domestic oven door includes an inner glass sheet intended to be the glass sheet closest to the compartment of the oven, and an outer glass sheet, the glass sheets being held rigidly connected and being separated by an air gap, the inner glass sheet possessing a chemical composition which includes the following constituents, in an amount by weight within the limits defined hereinafter:

| | |
|---|---|
| $SiO_2$ | 55-70% |
| $Al_2O_3$ | 12-25% |
| $B_2O_3$ | 0-0.5% |
| $Li_2O$ | 0-2% |
| $Na_2O + K_2O$ | 0-5% |
| MgO | 0-10% |
| CaO | 0-15% |
| SrO | 0-15% |
| BaO | 0-15% |
| ZnO | 0-5% |
| RO | 5-25% |
| where RO = MgO + CaO + SrO + BaO + ZnO | |
| $TiO_2$ | 0-3% |
| $ZrO_2$ | 0-4%. |

23 Claims, 1 Drawing Sheet

(51) Int. Cl.
*C03C 3/085* (2006.01)
*C03C 3/087* (2006.01)
*F24C 15/00* (2006.01)

(56) References Cited

U.S. PATENT DOCUMENTS

| | | | |
|---|---|---|---|
| 9,096,461 B2* | 8/2015 | Brix | |
| 2003/0023463 A1* | 1/2003 | Dombroski et al. | 705/5 |
| 2005/0145241 A1 | 7/2005 | Jordens | |
| 2011/0146776 A1* | 6/2011 | Carroll | C03C 8/06 136/256 |
| 2015/0111717 A1* | 4/2015 | Gabel | C03C 3/087 501/32 |

FOREIGN PATENT DOCUMENTS

| | | |
|---|---|---|
| FR | 2 477 525 | 9/1981 |
| JP | 2002-47030 | 2/2002 |
| WO | WO 2012/076289 | 6/2012 |

OTHER PUBLICATIONS

International Preliminary Report on Patentability issued for International Application No. PCT/FR2013/050577, dated Oct. 2, 2014.
International Search Report issued for International Application No. PCT/FR2013/050577, dated Jul. 12, 2013.

* cited by examiner

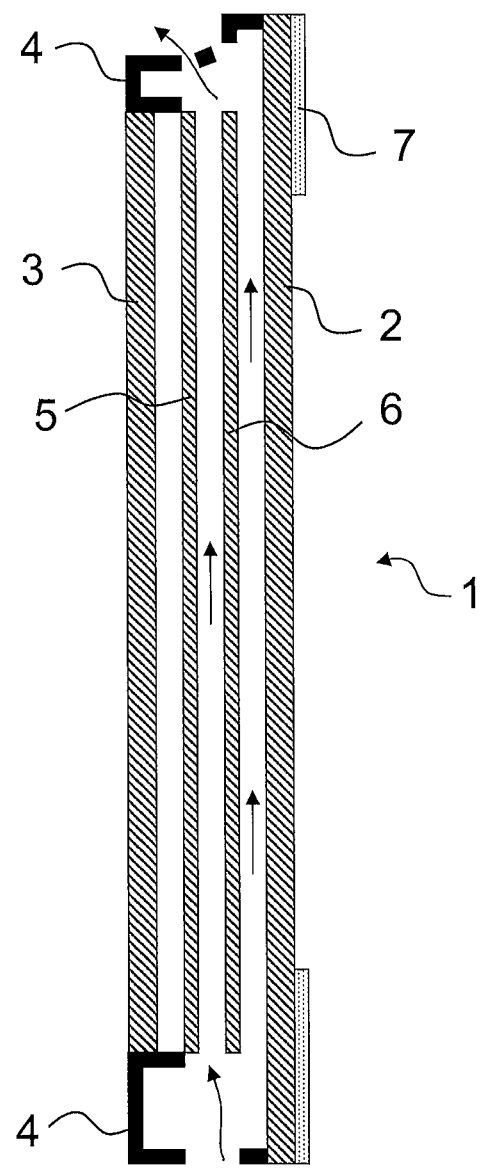

OVEN DOOR

CROSS-REFERENCE TO RELATED APPLICATIONS

This application is the U.S. National Stage of PCT/FR2013/050577, filed Mar. 19, 2013, which in turn claims priority to French Application No. 1252479, filed Mar. 20, 2012. The contents of all these applications are incorporated herein by reference in their entirety.

The invention relates to the field of domestic oven doors, intended in particular for closing off domestic electric pyrolytic ovens, commonly called "pyrolytic ovens".

Pyrolytic ovens are electric cooking ovens intended for cooking food, in which cleaning takes place by a high temperature increase capable of destroying the food residues. The pyrolysis cycles typically employed by current ovens envisage temperatures of at least 500° C. in the compartment of the oven.

The doors of a pyrolytic oven comprise at least two sheets of glass that are held rigidly connected, generally by means of a metal frame, and separated by an air gap. This configuration allows the temperature of the outer glass sheet, the one closest to the user, to be limited, so that said user cannot burn themself on contact with the door.

In view of the high temperatures used in the pyrolysis cycle, the inner glass sheet, which is the glass sheet closest to the compartment of the oven, must withstand high thermomechanical stresses, especially when it has a large surface area. Generally speaking, the inner glass sheet is made of borosilicate glass which exhibits low coefficients of expansion, of the order of $33 \times 10^{-7}/°$ C.

This solution, however, is not without disadvantages: borosilicate glasses are subject to a certain deformation at high temperature, which may reduce the thickness of the air gap and, consequently, downgrade the thermal insulation of the door. Moreover, their very low coefficients of thermal expansion in combination with their relatively low glass transition temperatures make it more difficult to obtain great differences in stresses between the core and the surface of the glass during thermal annealing. The borosilicate glasses used for oven doors therefore do not fragment in the event of breakage, thereby posing potential safety problems for the user of the oven.

The aim of the invention is to provide an oven door with an inner glass sheet which is better able to withstand the high temperatures. Another of its aims is to propose a glass sheet, intended to form the inner glass sheet of a pyrolytic oven door, that has a high hydrolysis resistance (in the sense of standard ISO 719) and chemical resistance, particularly with respect to acids (in the sense of standard DIN 12116) and to bases (according to standard ISO 695). Another aim of the invention is to provide a glass which can be produced economically by the float process and which in the molten state has a low capacity to corrode the refractories of the melting furnace.

The invention accordingly provides a domestic oven door comprising an inner glass sheet intended to be the glass sheet closest to the compartment of said oven, and an outer glass sheet, said glass sheets being held rigidly connected and being separated by at least one air gap, said inner glass sheet possessing a chemical composition which comprises the following constituents, in an amount by weight within the limits defined hereinafter:

| | |
|---|---|
| $SiO_2$ | 55-70% |
| $Al_2O_3$ | 12-25% |
| $B_2O_3$ | 0-0.5%, in particular 0 |
| $Li_2O$ | 0-2% |
| $Na_2O + K_2O$ | 0-5%, in particular 0-1% |
| MgO | 0-10% |
| CaO | 0-15% |
| SrO | 0-15% |
| BaO | 0-15% |
| ZnO | 0-5% |
| RO | 5-25% |
| where RO = MgO + CaO + SrO + BaO + ZnO | |
| $TiO_2$ | 0-3% |
| $ZrO_2$ | 0-4%. |

The invention likewise provides a domestic electric pyrolytic oven, comprising a compartment and an oven door according to the invention, the inner glass sheet being the glass sheet closest to said compartment.

Throughout the present text, the contents and amounts are amounts by weight.

The oven door according to the invention therefore comprises an inner glass sheet and an outer glass sheet, these two sheets forming the two principal planar outer faces of the door, such that when the door is mounted on the oven, the inner glass sheet is the closest to the compartment of the oven, and the outer sheet is the closest to the user.

The oven door according to the invention preferably comprises at least one intermediate glass sheet located between the inner glass sheet and the outer glass sheet, and separated from each of the latter by at least one air gap. One preferred door comprises three or four glass sheets, and therefore one or two intermediate glass sheets.

The presence of intermediate sheets produces additional air gaps which will further limit the temperature of the outer sheet of the door. These air gaps mean that flows of cooling air will circulate between the glass sheets, contributing to their cooling. The flow of air may be forced, by combining the door with a fan device that establishes an airflow circulating from the bottom edge of the door to the top edge. The oven door preferably comprises one or two intermediate sheets and the airflow is able to circulate only between the intermediate sheet and the outer sheet, and optionally between the intermediate sheets.

The sheets of glass may be held rigidly connected by various mechanical devices. As an example, the outer glass sheet may be combined with a rectangular metal frame fastened to its inner face (facing toward the compartment of the oven), and housing the inner glass sheet, and, optionally, the or each intermediate glass sheet. The inner and intermediate glass sheet or sheets may, for example, be inserted into grooves made in the frame. In that case, the outer glass sheet preferably has a surface area greater than the surface area of the other sheets of the door. The inner glass sheet may also be deformed at its periphery, by means of a burner, for example, such that said periphery follows the shape of a planar surface parallel to the principal surface of the glass sheet, this planar surface bearing on the face of the frame opposite the face fastened to the outer glass sheet. The effect of the resulting increase in the space between the glass sheets is to increase the airflow.

In order to ensure the aforementioned airflow, the metal frame preferably possesses a plurality of longitudinal slots at the top and bottom edges of the door.

The inner and outer glass sheets are held parallel to one another, by means of the aforementioned metal frame, for example. The intermediate glass sheets may or may not be parallel with the inner and outer glass sheets.

The outer glass sheet is preferably coated over part of its outer face (that intended to face the user) with a decoration, in particular in the form of enamel applied by screen printing, and intended, for example, to hide the various elements for fastening the glass sheets and to make visible only the inside of the oven compartment. The inner glass sheet may also be coated with an enameled decoration, applied, for example, by screen printing to the face directed toward the outer sheet, in particular around its outer edge. Where the inner glass sheet is thermally toughened, the enamel may be cured during the toughening step.

The thickness of the glass sheets (and in particular of the inner glass sheet) is preferably in a range from 2 to 5 mm, in particular from 2.5 to 4.5 mm. Thicknesses of 3 or 4 mm are particularly advantageous in terms of cost, weight, and thermal insulation on the part of the door. The thickness of the or each air gap is typically in a range from 2 to 6 mm, in particular from 3 to 5 mm. The total thickness of the door is generally in a range from 6 to 50 mm, in particular from 15 to 40 mm.

The glass sheets generally exhibit a rectangular-shaped surface, with the corners possibly being rounded optionally.

Advantageously at least the inner glass sheet is thermally toughened. The other glass sheets may also be so. Thermal toughening involves heating beyond the glass transition temperature of the glass, followed by rapid cooling, generally by means of air blasting, this cooling producing high surface compressive stresses, which contribute to reinforcing the thermomechanical strength of the glass. The glasses proposed for the oven door according to the invention are of high suitability for toughening, as compared with borosilicate glasses, by virtue of their coefficients of thermal expansion, their glass transition temperatures (or their lower annealing temperatures), and their Young's moduli, which are higher. Consequently, in the event of accidental breakage, the glasses according to the invention will break into a multitude of fragments which are not sharp, a process known as "fragmenting".

The outer glass sheet and, where appropriate, the or each intermediate glass sheet is preferably made of soda-lime-silica glass. These glass sheets undergo thermomechanical stresses which are much less strong than those undergone by the inner glass sheet, meaning that it is possible to use less expensive, common glasses.

At least one glass sheet, in particular an intermediate glass sheet, is advantageously coated with a low-emissivity layer, in particular with a layer of a transparent, electrically conducting oxide (TCO), such as, for example, tin oxide which is doped, in particular, with fluorine or with antimony. The presence of such layers reduces heat exchange between the glass sheets, thus contributing to enhancing the thermal insulation on the part of the door.

The glass forming the inner sheet of glass preferably possesses a lower annealing temperature of at least 580° C., in particular 600° C., and not more than 750° C., in particular 720° C., or else 700° C. and 650° C. or 640° C. Too low a lower annealing temperature may give rise to deformations of the glass sheet during pyrolysis cycles. Conversely, lower annealing temperatures that are too high would make thermal toughening of the glass more difficult, since they would necessitate very high heating temperatures. The lower annealing temperature (or strain temperature) is measured in accordance with the standard ISO 7884-7:1987.

The glass forming the inner glass sheet preferably possesses a coefficient of linear thermal expansion within a range from 30 (in particular 40) to $80 \times 10^{-7}/°$ C., in particular not more than $60 \times 10^{-7}/°$ C., or even $50 \times 10^{-7}/°$ C.

Too low a coefficient of expansion is detrimental to a high suitability for thermal toughening, while a high coefficient of expansion may give rise to excessively low resistance to thermal shock. The coefficient of expansion is measured in accordance with the standard ISO 7991:1987.

The luminous transmission factor within the meaning of standard ISO 9050:2003 of the inner glass sheet is preferably at least 85%, even 88%, in order to ensure better visibility of the oven compartment by users. The yellowness index of the inner glass sheet is preferably not more than 4, in particular 1, and even 0.5, within the meaning of the standard ASTM E313.

The glass forming the inner glass sheet preferably possesses a temperature corresponding to a viscosity of $10^{3.5}$ poises (called "T3.5") of not more than 1480° C., in particular 1425° C. or 1400° C. The liquidus temperature of the glass is advantageously not more than 1410° C., in particular 1390° C. and even 1380° C. The temperature T3.5 is preferably not more than 1420° C., the liquidus temperature being less than the temperature T3.5 and not more than 1390° C. These conditions ensure that the glass is highly suitable for production by the float glass process, which involves discharging the glass onto a bath of molten tin.

Silica ($SiO_2$) is the main formative element of glass. A minimum amount is necessary in order to prevent any devitrification and to enhance the chemical resistance and hydrolytic resistance of the glass. High levels, however, lead to an increase in the viscosity of the glass, making it more difficult and more energy-intensive to produce. The silica content is advantageously at least 56%, in particular 57% or 58%, or even 59% or 60%, or else 61% or 62%. In certain embodiments, the silica content may even be at least 63% or 64%, in particular 65% or 66%. Silica contents of not more than 69%, in particular 68%, are preferred. Preferred ranges are, for example, 60-70%, or else 60-68%.

Alumina ($Al_2O_3$) increases the hydrolytic resistance and the thermomechanical strength of the glass, though at the expense of its viscosity. The alumina content is preferably at least 13%, in particular 14% or 15%, or even 16% or 17%, and even 18%, 19%, or else 20%. It is advantageously not more than 24% or 23%, or even 22% or 21%. Preferred ranges are, for example, 12-16%, 18-25%, in particular 18-20% or 20-24%.

The sum of the amounts of silica and alumina ($SiO_2$+$Al_2O_3$) is preferably in a range from 70% to 90%, in particular from 75% to 85%. Levels that are too high may lead to increasing the viscosity in an inadvisable way.

The boron oxide ($B_2O_3$) content is advantageously zero, since this oxide is expensive and is environmentally detrimental, in particular because of the emissions it causes during melting of the glass. European regulations, moreover, require the installation of protective measures when handling carriers of boron, owing to its attributed reproductive toxicity.

Lithium oxide ($Li_2O$) has proven advantageous as a fluxing agent for the glass, even in a very small amount. In view of its high cost, the amount thereof is advantageously not more than 1.9%, in particular 1.8%, or even 1.7% and even 1.6%. Limiting the $Li_2O$ content also allows the use of certain advantageous raw materials, such as spodumene, while limiting the iron oxide content of the final glass. According to certain embodiments, the $Li_2O$ content may be not more than 0.5% and even zero. According to other embodiments, the $Li_2O$ content is at least 0.5%, in particular 0.6% or 0.7%, or even 0.8% or 0.9%, and even 1% or 1.2%, or else 1.3% or 1.4%. In this case, preferred ranges are 0.5-1.8% or else 1-1.7%.

The other alkali metal oxides, sodium oxide ($Na_2O$) and potassium oxide ($K_2O$), tend to be undesirable, since they increase the corrosion of the refractories by the molten glass and also the coefficient of expansion of the glass, while reducing its hydrolytic and chemical resistance. The $Na_2O$+$K_2O$ content is therefore preferably not more than 3%, 2%, 1%, 0.8%, in particular 0.6%, and even 0.5% or 0.4%. According to some embodiments, this amount may be zero.

The divalent oxides (MgO, CaO, SrO, BaO, and ZnO), referred to collectively as "RO", are vital for obtaining viscosities that allow the glass to be melted under economically advantageous conditions. They also raise the lower annealing temperature of the glass (when used as a substitute for the alkali metal oxides), and hence its resistance to deformation at high temperature. The RO content is preferably at least 6%, in particular 7% or 8%, or even 9% or 10%. In order to limit the risks of devitrification, this amount is preferably not more than 23%, in particular 21% or 20%, or even 19% or 18%, and even 17% or 16%. In certain cases, in particular when the BaO content is not more than 1%, the RO content may be not more than 15%, in particular 14% or 13%, or even 12% or 11%, and even 10% or else 9%.

Among the divalent oxides, it may be preferred for the amount of SrO+BaO+ZnO to be at least 3%, in particular 4% or 5% and/or not more than 20%, in particular 18% or 15%. According to one embodiment, the SrO+BaO+ZnO content is from 0% to 15% or from 0% to 10% or from 0% to 6%, in particular from 0% to 5% or from 0% to 4%, especially when the $Li_2O$ content is from 0 to 0.5%, or is zero. According to another embodiment, the amount of SrO+BaO+ZnO is from 5% to 20%, in particular 8% to 18%.

Magnesium oxide (MgO) is advantageous as a fluxing agent for the glass at high temperature. High levels, however, may increase the risks of devitrification of the glass. The MgO content is preferably at least 1%, or even 2% or 3%, or even 5% for certain embodiments. It is advantageously not more than 8%, in particular 7% and even 6%. According to certain embodiments, the MgO content is from 5% to 10%, in particular from 5% to 8%. According to other embodiments, the MgO content is from 1% to 6%, in particular from 1% to 5%.

Lime (CaO) is also a fluxing agent; however, in view of the corrosion of certain refractories that is induced by this oxide, its amount is preferably not more than 9%, in particular 8% or 7%, or even 6% or 5%, and even 4% and 3%, or else 2% or 1%. According to certain embodiments, this amount may be zero. Preferred ranges are in particular 0-5% or 0-1%. In other embodiments, the CaO content may be from 5% to 15%, in particular from 10% to 15%.

The amount of strontium oxide (SrO) may be at least 1%, in particular 2% and even 3% or 4%, or else even 5% or 6%. This amount may be not more than 9%, or even 8% or 7%, in particular 6% or 5%. According to certain embodiments, the SrO content may be not more than 4%, in particular 3% or 2%, and even 1% or else zero, in particular when the glass contains at least 1% of BaO and/or of ZnO.

The amount of barium oxide (BaO) may be at least 1%, in particular 2%, and even 3% or 4%, and even 5% and 6%. In certain cases, the BaO content may even be at least 7%, in particular 8% or 9%, or even 10% or 11%, or else 12% or 13%. This amount may be not more than 9%, or even 8% or 7%, in particular 6% or 5%. According to certain embodiments, the BaO content may be not more than 4%, in particular 3% or 2%, and even 1% or else zero, in particular when the glass contains at least 1% of SrO and/or of ZnO.

The amount of zinc oxide (ZnO) may be at least 1%, in particular 1.5%, or even 2%. According to certain embodiments, the ZnO content may be not more than 4%, in particular 3% or 2%, and even 1% or else zero, in particular when the glass contains at least 1% of SrO and/or of BaO.

The amount of titanium oxide ($TiO_2$) is preferably not more than 2%, in particular 1% or 0.4%, in particular 0.3% and even 0.2% or 0.1%, or even 0.05%. The reason is that this oxide reinforces the yellowness index of the glass.

Zirconium oxide ($ZrO_2$) may contribute to increasing the chemical resistance and thermomechanical strength of the glass. For this reason, the amount thereof may advantageously be at least 0.5%, in particular 1%, or else 1.5% or 2%, or even 3%. According to certain embodiments, the amount thereof is preferably not more 3.5 than 3%, in particular 2%. It may even be zero in certain cases. The reason is that high levels of zirconium oxide make the melting of the glass more difficult while increasing the liquidus temperature.

It is self-evident that the various preferred ranges described above may be combined with one another, according to all the possible combinations, without the entirety of these combinations being able to be indicated in the present description. A number of particularly preferred oxide combinations are presented below:

Combination 1:

| | |
|---|---|
| $Li_2O$ | 0-0.5%, in particular 0 |
| MgO | 5-10%, in particular 5-8% |
| CaO | 0-5%, in particular 0-1% |
| SrO + BaO + ZnO | 0-15%, in particular 0-10% |

Combination 2:

| | |
|---|---|
| $Li_2O$ | 0-0.5%, in particular 0 |
| MgO | 1-6%, in particular 1-5% |
| CaO | 0-5%, in particular 0-1% |
| SrO + BaO + ZnO | 5-20%, in particular 8-18% |

Combination 3:

| | |
|---|---|
| $Li_2O$ | 0-0.5%, in particular 0 |
| MgO | 0-7%, in particular 3-6% |
| CaO | 5-15%, in particular 10-15% |
| SrO + BaO + ZnO | 0-10%, in particular 0-2% |

Combination 4:

| | |
|---|---|
| $Li_2O$ | 0.5-1.8%, in particular 1-1.7% |
| MgO | 5-10%, in particular 5-8% |
| CaO | 0-7%, in particular 0-5% or 0-1% |
| SrO + BaO + ZnO | 0-6%, in particular 0-4% |

Combination 5:

| | |
|---|---|
| $Li_2O$ | 0.5-1.8%, in particular 1-1.7% |
| MgO | 1-6%, in particular 1-3% |
| CaO | 0-5%, in particular 0-1% |
| SrO + BaO + ZnO | 5-20%, in particular 8-18% |

More specifically, according to a first preferred embodiment, the inner glass sheet possesses a chemical composition which comprises the following constituents, in an amount by weight within the limits defined hereinafter:

| | |
|---|---|
| $SiO_2$ | 60-70%, in particular 60-68% |
| $Al_2O_3$ | 18-25%, in particular 20-24% |
| $B2O_3$ | 0 |
| $Li_2O$ | 0-0.5%, in particular 0 |
| $Na_2O+ K_2O$ | 0-1% |
| MgO | 5-10%, in particular 5-8% |
| CaO | 0-5%, in particular 0-1% |

| | -continued |
|---|---|
| SrO + BaO + ZnO | 0-15%, in particular 0-10%, or even 0-6%, and even 0-4% |
| $TiO_2$ | 0-0.5%, in particular 0-0.05% |
| $ZrO_2$ | 0-4%, in particular 0. |

According to a second preferred embodiment, the inner glass sheet possesses a chemical composition which comprises the following constituents, in an amount by weight within the limits defined hereinafter:

| $SiO_2$ | 60-70%, in particular 60-68% |
|---|---|
| $Al_2O_3$ | 18-25%, in particular 20-24% |
| $B_2O_3$ | 0 |
| $Li_2O$ | 0-0.5%, in particular 0 |
| $Na_2O + K_2O$ | 0-1% |
| MgO | 1-6%, in particular 1-5% |
| CaO | 0-5%, in particular 0-1% |
| SrO + BaO + ZnO | 5-20%, in particular 8-18% |
| $TiO_2$ | 0-0.5%, in particular 0-0.05% |
| $ZrO_2$ | 0-4%, in particular 0. |

According to a third preferred embodiment, the inner glass sheet possesses a chemical composition which comprises the following constituents, in an amount by weight within the limits defined hereinafter:

| $SiO_2$ | 60-70%, in particular 60-68% |
|---|---|
| $Al_2O_3$ | 12-16%, in particular 14-16% |
| $B_2O_3$ | 0 |
| $Li_2O$ | 0-0.5%, in particular 0 |
| $Na_2O + K_2O$ | 0-1%, in particular 0-0.5% |
| MgO | 0-7%, in particular 3-6% |
| CaO | 5-15%, in particular 10-15% |
| SrO + BaO + ZnO | 0-10%, in particular 0-2% |
| $TiO_2$ | 0-0.5%, in particular 0-0.05% |
| $ZrO_2$ | 0-4%, in particular 0. |

According to a fourth preferred embodiment, the inner glass sheet possesses a chemical composition which comprises the following constituents, in an amount by weight within the limits defined hereinafter:

| $SiO_2$ | 60-70%, in particular 60-68% |
|---|---|
| $Al_2O_3$ | 16-24%, in particular 17-23% |
| $B_2O_3$ | 0 |
| $Li_2O$ | 0.5-1.8%, in particular 1-1.7% |
| $Na_2O + K_2O$ | 0-0.5% |
| MgO | 5-10%, in particular 5-8% |
| CaO | 0-7%, in particular 0-1% |
| SrO + BaO + ZnO | 0-6%, in particular 0-4% |
| $TiO_2$ | 0-0.5%, in particular 0-0.05% |
| $ZrO_2$ | 0-4%, in particular 0. |

According to a fifth preferred embodiment, the inner glass sheet possesses a chemical composition which comprises the following constituents, in an amount by weight within the limits defined hereinafter:

| $SiO_2$ | 60-70%, in particular 60-68% |
|---|---|
| $Al_2O_3$ | 16-24%, in particular 17-23% |
| $B_2O_3$ | 0 |
| $Li_2O$ | 0.5-1.8%, in particular 1-1.7% |
| $Na_2O + K_2O$ | 0-5%, in particular 0-0.5% |
| MgO | 1-6%, in particular 1-3% |
| CaO | 0-5%, in particular 0-1% |
| SrO + BaO + ZnO | 5-20%, in particular 8-18% |
| $TiO_2$ | 0-3%, in particular 0-1% |
| $ZrO_2$ | 0-4%, in particular 0. |

Preferably, in general as for each of these preferred embodiments, the total amount of $SiO_2$, $Al_2O_3$, $Li_2O$, $Na_2O$, $K_2O$, MgO, CaO, SrO, BaO, ZnO, $TiO_2$, $ZrO_2$ is at least 90%, in particular 91% and even 92%, or even 94% or 95%, or else 96% or 97%.

The composition of the glass may include other constituents.

These may be refining agents, in an amount generally of not more than 1% or 2%, selected in particular from sulfates, halogens (in particular chlorine), sulfides (in particular zinc sulfide), oxides of arsenic, of antimony, of iron, of tin, of cerium, of vanadium, or any one of their mixtures. The refining agents serve the purpose of removing any gaseous inclusions from the molten glass. Particularly preferred among these agents is tin oxide, and its content by mass is advantageously within a range from 0.1%, in particular 0.2% to 0.6%, in particular 0.5%.

They may also be coloring agents, although their presence is in general not desirable. The amount of such agents is generally not more than 1%, in particular 0.5% and even 0.3%. They may be agents selected from iron oxide ($Fe_2O_3$, FeO), whose presence is generally inevitable since it is present in many natural raw materials, including sand or spodumene; oxides of transition elements (copper, cobalt, chromium, nickel, manganese, vanadium, etc.) or of rare earths (cerium, neodymium, erbium, etc.), metals (Ag, Cu, Au, etc.), sulfides, selenium, or any one of their mixtures.

The inner glass sheet is preferably obtained by the float process. The same is also preferably the case for the other glass sheets of the oven door. Nevertheless, other methods may be contemplated, such as the method of rolling between rollers, or drawing methods.

FIG. 1 is a diagrammatic sectional view of an oven door according to the invention.

The oven door 1 comprises an outer glass sheet 2 and an inner glass sheet 3 which are held rigidly connected and parallel by means of a metal frame 4.

Intermediate glass sheets 5 and 6 are disposed between the outer 2 and inner 3 glass sheets and are held by the frame 4 at the side edges. Between the sheets of glass, accordingly, they make air gaps, which enhance the thermal insulation on the part of the door 1.

The metal frame 4 is fastened to the inner face of the outer glass sheet 2 and comprises longitudinal slots regularly spaced at the top and bottom edges of the door 1. These slots are configured in such a way as to allow the circulation of an airflow (schematized by vertical arrows) from the bottom edge of the door to the top edge, allowing the surface of the glass sheets to be cooled and therefore the thermal insulation on the part of the door 1 to be enhanced. In the specific case shown in FIG. 1, the airflow is able to circulate only between the intermediate sheet 6 and the outer sheet 2 and between the intermediate sheet 6 and the intermediate sheet 5.

The outer glass sheet 2 comprises on its outer face (directed toward the user) an enamel decoration 7 applied by screen printing around the edges of the sheet so as to hide the metal frame 4. The outer glass sheet 2 also has a handle (not shown).

The inner glass sheet 3 is thermally toughened and possesses the particular aforementioned chemical composition, giving it an enhanced thermomechanical strength. The other glass sheets, 2, 5, and 6, are made of thermally toughened soda-lime-silica glass. At least one intermediate glass sheet, 5 or 6, is coated on at least one of its faces with a low-emissivity coating in the form of a thin layer of fluorine-doped tin oxide.

The invention will be understood more effectively from a reading of the nonlimiting embodiment examples which follow.

Tables 1 and 2 below show glass compositions which can be used to form the inner glass sheet of oven doors according to the invention.

As well as the compositions (expressed as percentages by weight), tables 1 and 2 show the following properties:
- the coefficient of linear thermal expansion, identified as "α" and expressed in $10^{-7}/K$;
- the liquidus temperature, identified as "$T_L$" and expressed in °C.;
- the temperature at which the glass has a viscosity of $10^{3.5}$ poises, identified as "T3.5" and expressed in °C.;
- the glass transition temperature, identified as "$T_g$" and expressed in °C.

TABLE 1

|  | 1 | 2 | 3 | 4 | 5 |
|---|---|---|---|---|---|
| $SiO_2$ | 65.9 | 62.8 | 65.7 | 64.2 | 62.8 |
| $Al_2O_3$ | 22.3 | 18.4 | 22.2 | 18.8 | 18.4 |
| $B_2O_3$ | 0 | 0 | 0 | 0 | 0 |
| $Li_2O$ | 0 | 1.5 | 0 | 1.5 | 1.5 |
| $Na_2O$ | 0.6 | 0.16 | 0.6 | 0.15 | 0.2 |
| $K_2O$ | 0.3 | 0.18 | 0.3 | 0.15 | 0.2 |
| MgO | 7.1 | 1.13 | 5.8 | 1.15 | 1.1 |
| CaO | 0 | 0 | 1.7 | 0 | 0 |
| SrO | 0 | 0 | 0 | 9.8 | 4.7 |
| BaO | 2 | 10.0 | 2 | 0.75 | 7.7 |
| ZnO | 1.5 | 1.5 | 1.5 | 1.6 | 1.5 |
| $TiO_2$ | 0 | 2.4 | 0 | 0 | 0 |
| $ZrO_2$ | 0 | 1.6 | 0 | 1.6 | 1.6 |
| $SnO_2$ | 0.3 | 0.3 | 0.3 | 0.3 | 0.3 |
| α | 32 | 41 | 34 | 43 | 41 |
| $T_L$ |  | 1370 | 1410 | 1380 | 1330 |
| T3.5 | 1413 | 1455 | 1418 | 1454 | 1476 |
| $T_g$ |  | 745 |  | 775 | 776 |

TABLE 2

|  | 6 | 7 | 8 | 9 | 10 |
|---|---|---|---|---|---|
| $SiO_2$ | 66.3 | 67.0 | 66.9 | 62.7 | 64.5 |
| $Al_2O_3$ | 14.8 | 19.6 | 19.6 | 14.0 | 14.4 |
| $B_2O_3$ | 0 | 0 | 0 | 0 | 0 |
| $Li_2O$ | 0 | 1.5 | 1.5 | 0 | 0 |
| $Na_2O$ | 0 | 0.2 | 1.3 | 0 | 0 |
| $K_2O$ | 0 | 0.2 | 1.6 | 0 | 0 |
| MgO | 5.4 | 1.2 | 3 | 7.8 | 8.8 |
| CaO | 13.2 | 4.2 | 0 | 5.0 | 3.0 |
| SrO | 0 | 0 | 0 | 0 | 0 |
| BaO | 0 | 0.8 | 0.8 | 10.2 | 9.1 |
| ZnO | 0 | 1.6 | 1.6 | 0 | 0 |
| $TiO_2$ | 0.02 | 2.6 | 2.6 | 0 | 0 |
| $ZrO_2$ | 0 | 0.8 | 0.8 | 0 | 0 |
| $SnO_2$ | 0.3 | 0.3 | 0.3 | 0.3 | 0.3 |
| α | 42 | 43.4 | 43.5 | 46.2 | 42.5 |
| $T_L$ | 1360 | <1350 | 1310 | 1280 | 1300 |
| T3.5 | 1379 | 1421 | 1439 | 1383 | 1426 |
| $T_g$ | 800 | 724 | 700 |  |  |

The invention claimed is:

1. A domestic oven door comprising an inner glass sheet intended to be the glass sheet closest to a compartment of said oven, and an outer glass sheet, said inner and outer glass sheets being held rigidly connected and being separated by at least one air gap, said inner glass sheet possessing a chemical composition which comprises the following constituents, in an amount by weight within the limits defined hereinafter:

| $SiO_2$ | 55-70% |
| $Al_2O_3$ | 12-25% |
| $B_2O_3$ | 0-0.5% |
| $Li_2O$ | 0-2% |
| $Na_2O + K_2O$ | 0-5% |
| MgO | 0-10% |
| CaO | 0-15% |
| SrO | 0-15% |
| BaO | 0-15% |
| ZnO | 0-5% |
| RO | 5-25% |
| where RO = MgO + CaO + SrO + BaO + ZnO | |
| $TiO_2$ | 0-3% |
| $ZrO_2$ | 0-4%. |

2. The oven door as claimed in claim 1, comprising at least one intermediate glass sheet located between the inner glass sheet and the outer glass sheet, and separated from each of the latter by at least one air gap.

3. The oven door as claimed in claim 1, a thickness of the inner and outer glass sheets being within a range from 2 to 5 mm.

4. The oven door as claimed in claim 1, wherein at least the inner glass sheet is thermally toughened.

5. The oven door as claimed in claim 1, the outer glass sheet and, optionally, the or each intermediate glass sheet being made of soda-lime-silica glass.

6. The oven door as claimed in claim 1, at least one glass sheet being coated with a low-emissivity layer.

7. The oven door as claimed in claim 1, the glass forming the inner glass sheet possessing a lower annealing temperature of at least 580° C. and not more than 750° C.

8. The oven door as claimed in claim 1, the chemical composition of the inner glass sheet comprising an $Li_2O$ content of not more than 0.5%.

9. The oven door as claimed in claim 8, the inner glass sheet possessing a chemical composition which comprises the following constituents, in an amount by weight within the limits defined hereinafter:

| MgO | 5-10% |
| CaO | 0-5% |
| SrO + BaO + ZnO | 0-15%. |

10. The oven door as claimed in claim 8, the inner glass sheet possessing a chemical composition which comprises the following constituents, in an amount by weight within the limits defined hereinafter:

| MgO | 0-7% |
| CaO | 5-15% |
| SrO + BaO + ZnO | 0-10%. |

11. The oven door as claimed in claim 1, the chemical composition of the inner glass sheet comprising an $Li_2O$ content of between 0.5% and 1.8%.

12. The oven door as claimed in claim 11, the inner glass sheet possessing a chemical composition which comprises the following constituents, in an amount by weight within the limits defined hereinafter:

| MgO | 5-10% |
| CaO | 0-7% |
| SrO + BaO + ZnO | 0-6%. |

13. The oven door as claimed in claim 8, the inner glass sheet possessing a chemical composition which comprises the following constituents, in an amount by weight within the limits defined hereinafter:

| | |
|---|---|
| MgO | 1-6% |
| CaO | 0-5% |
| SrO + BaO + ZnO | 5-20%. |

14. The oven door as claimed in claim 1, the chemical composition of the inner glass sheet comprising an SrO+BaO+ZnO content of at least 3%.

15. A domestic electric pyrolytic oven, comprising a compartment and an oven door as claimed in claim 1, the inner glass sheet being the glass sheet closest to said compartment.

16. The oven door as claimed in claim 1, wherein the amount by weight of $Na_2O+K_2O$ is 0-1%.

17. The oven door as claimed in claim 6, wherein the at least one glass sheet is an intermediate glass sheet.

18. The oven door as claimed in claim 8, wherein the $Li_2O$ content is zero.

19. The oven door as claimed in claim 11, wherein the $Li_2O$ content is between 1% and 1.7%.

20. The oven door as claimed in claim 14, wherein the SrO+BaO+ZnO content is at least 5%.

21. The oven door as claimed in claim 1, wherein the $B_2O_3$ content is zero.

22. The oven door as claimed in claim 1, wherein the RO content is 7-20%.

23. The oven door as claimed in claim 22, wherein the RO content is 10-17%.

\* \* \* \* \*